Aug. 14, 1934.   H. W. CODDINGTON   1,970,167

LUBRICATING DEVICE FOR LOCOMOTIVE DRIVER JOURNALS

Filed Feb. 25, 1931

INVENTOR.
Harry W. Coddington
BY
B. W. Kadel.
ATTORNEY.

Patented Aug. 14, 1934

1,970,167

UNITED STATES PATENT OFFICE 1,970,167

LUBRICATING DEVICE FOR LOCOMOTIVE DRIVER JOURNALS

Harry W. Coddington, Roanoke, Va.

Application February 25, 1931, Serial No. 518,052

6 Claims. (Cl. 308—79)

This invention relates to lubrications of a type adapted for heavy service, particularly for the bearings of locomotive driving axles. It has among its objects to provide in connection with a locomotive driving box a lubricating mechanism adapted to employ oil lubrication as a supplement to and along with grease lubrication; also to provide a preferred arrangement of oil lubricating mechanism for such bearings; also to arrange a grease lubricator for such a bearing that will combine effectiveness with economy of lubricant.

With these general and other more specific objects in view the invention consists of the formation, combination and arrangement of parts as will be herein described and particularly claimed.

Figure 1:
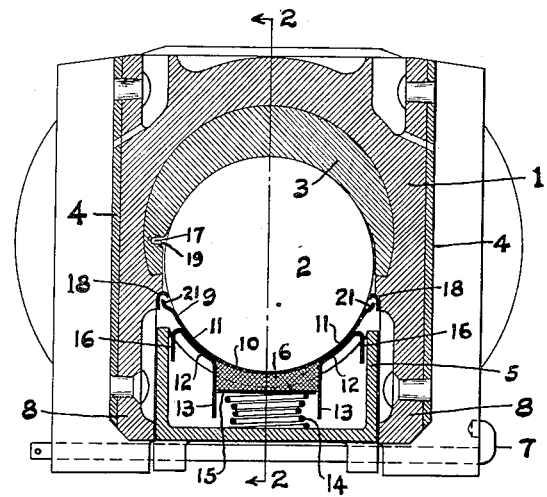
Figure 2:
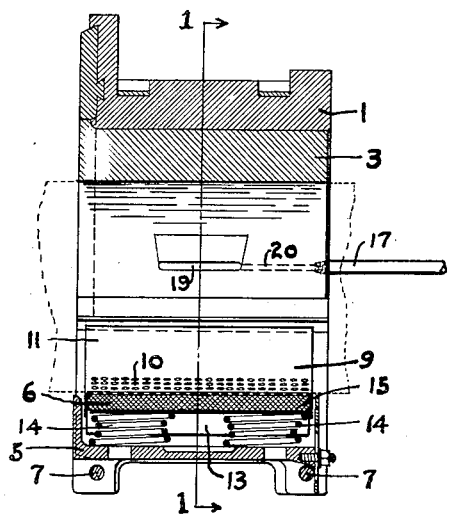

In the accompanying drawing, Figure 1 is a transverse vertical section through a locomotive driver box and bearing, the section being taken substantially in a plane denoted by the line 1—1 of Figure 2. Figure 2 is an upright vertical section taken through the same journal box and bearing in a plane longitudinal of the axle, this section being taken substantially at right angles to the plane of Figure 1 and in a plane substantially on the line 2—2 of Figure 1. The journal bearing illustrated in these figures is shown as embodying the principles of the present invention. The journal of the axle is indicated in dotted lines, but the remainder of the axle is not shown nor are the other adjacent parts of the locomotive running gear, as all of these are well known to those acquainted with the art, and the showing thereof is not necessary for an understanding of the invention.

Referring now to this drawing, the journal box as a whole, which as illustrated is of the pedestal type, is denoted by the numeral 1, the opening 2 thereof being for the journal cylinder of the axle. Such journal boxes are usually constructed of cast metal, preferably cast iron or cast steel and affixed therein for pressure contact with the axle is the bronze bearing member 3. Similar pressure slide members or anti-friction liners 4 are usually affixed to the exterior faces of the box where the same contacts with the frame pedestals of the locomotive. All of this is usual and well known construction.

The purpose of the present invention being to improve existing lubricators, particularly those affixed to or intended for use with journal boxes and bearings of the above style, a discussion of the lubrication problems in connection with such bearings will be helpful in understanding the necessity for and the benefits derived from the present new construction.

It has become recognized that lubrication of such bearings by means of hard or semi-hard grease lubricants, although generally used in modern practice on locomotives, is not completely satisfactory, principally because it is necessary that a high journal temperature be first generated before the grease reaches a temperature where it will flow and form a lubricating film. The lubricant should preferably form the lubricating film in advance of such temperature, and in fact should act to prevent the generation of this very heat.

The use of free oil as a lubricant for such bearings has been attempted from time to time. If a suitable oil could be successfully employed it would provide the desired film in advance of the generation of heat. But in spite of many attempts at oil lubrication, grease today remains the almost universal lubricant for modern locomotive driver boxes. The failure of oil lubrication for these bearings has been due to the inadequacy of the light body of oil to maintain such a film as is needed when abnormal and heavy conditions arise in this service. The oil film breaks down under the severe conditions, and once broken down it will not recover itself, and hot and scored journals and bearings result.

Oil lubrication, in spite of this defect, is generally recognized as superior to heavy grease lubrication on account of closer initial fitting of the bearing, lower operating temperatures, lower rate of wear, and lower frictional resistance in the bearing. It is, however, subject to occasional lubricating failures in service for the reasons hereinbefore mentioned.

The present invention has among its objects to correct this defect in oil lubrication, namely, by supplementing the oil lubrication with grease or other heavier lubricant, so that the low temperature and other benefits of the oil film will be realized and the danger from a break-down of the oil film will be avoided.

With this discussion of the problems and aims as a background, a description of the embodiment of the invention as illustrated in the accompanying drawing will now be given.

The journal or driving box 1 heretofore referred to is of the customary inverted U-shape, and the usual grease cellar 5 may advantageously be employed to support the grease cake 6 and for other incidental purposes. This cellar 5 is shown as supported in the usual manner from the side arms of the U by means of the cellar bolts or fastenings 7. When these bolts 7 are removed the cellar may be dropped from its position between the side arms 8 of the driving box 1.

The grease cake 6 is of the same general type as those in use today, being however preferably of the "narrow" type, that is, its width is materially less than the diameter of the journal.

Positioned against the under face of the journal cylinder of the axle is a metal plate 9 of arcuate form, being thus shaped to conform to the cylindrical shape of the axle. The central portion 10 of this plate is perforated or foraminous to permit the passage therethrough of grease from the cake 6, also under certain conditions to permit the mixing therethrough of oil and grease. The plate 9 follows the circumference of the axle for some distance to each side of the limits of the grease cake, and these laterally extending portions 11 of the plate 9 are not perforated, but present flat rubbing surfaces for the grease to be wiped against the under face of the journal.

Rigidly secured to the outer periphery of the plate 9 are a pair of spaced guide members 12. These have depending wings 13 which form a pair of spaced side walls, the space therebetween comprising a cavity for the block of grease 6. The grease block extends for substantially the full length of the journal and is pressed upward into intimate relationship with the plate 10 by means of the two coil springs 14, these acting between the grease cellar 5 and a metal plate 15, which is inserted next beneath the grease block 6. It will be seen that the upward pressure of the springs 14 presses the grease block against the perforated portion 10 of the plate 9, and also forces grease from the block 6 through these perforations against the journal. The spring pressure also forces the entire plate 9 up against the under surface of the journal and into rubbing relationship therewith.

The remote edges of the members 12 are formed as depending guides 16, which cooperate with the interior faces of the sides of the grease cellar 5 to guide the entire plate 9 together with the grease block 6 and the associated parts.

For use in connection with a grease lubricator, and particularly with one of the general type just described, there is provided a source of lubricating oil which is indicated by the pipe 17. It is to be understood that oil may be supplied through any acceptable means such as oil pump, oil fountain, oil splash, or any of the many usual and well known means. The present invention has not to do with the means for delivering the oil to the bearing but rather with the handling thereof at the bearing itself.

Oil from the source 17 is fed through any suitable channel 20 and outlet 19 to the surface of the journal where it will spread over and form an oil film upon the rotating journal. It is preferable that the oil outlet 19 be located near the side of the journal rather than the top thereof, not only to avoid excessive pressure on the outlet groove 19, but also for reasons peculiar to traction journals of the railway locomotive type. It is known to those familiar with locomotive lubrication that where grease cake lubrication is used beneath the journal and an oil hole is provided at or near the top of the journal the grease will be forced or pumped upwards through such an oil hole away from the bearing instead of oil flowing down through the hole to the bearing as is necessary in the present mechanism. This action of the grease is well known and is believed to be due to the traction efforts from the locomotive pistons which alternately subject the bearing to push and pull. At the same time the traction resistance, that is the drag of the train, remains in one direction. This constantly changing combination of live forces acts on the dead weight on the bearing to cause a shifting in the actual center of pressure on the bearing, and is believed to be the explanation of the pumping of grease mentioned above.

By locating the outlet groove 19 at the side of the bearing and remote from the area of intense pressure, it is practical to feed oil on to the bearing at the same time grease is being used. The groove being located below the line of pressure, grease is not forced or pumped through it, and oil is fed to the bearing simultaneously with the grease lubrication thereof as is desired.

Oil from the outlet 19 is spread over the journal as heretofore explained and as long as the severity of the service does not cause a breakdown of the oil film the bearing will be almost entirely oil-lubricated, inasmuch as not sufficient heat will have been generated to soften the grease. There will, however, be some grease lubrication at this time inasmuch as there will be some mechanical mixing of the oil and grease even though the bearing may be quite cool. This will be understood by noting that all excess oil taken up by the journal from the outlet 19 will be carried around the journal and wiped between the under periphery of the journal and the top of the plate 10, thereby causing it to be mechanically mixed with the grease that is pressed upward through the perforations. In order that all of such oil may be delivered to one or the other of the portions 11 of the plate 10, (depending upon the direction of rotation of the journal), oil-shedding strips 18 are welded to the side arms of the journal box along the sides of the journals. The inner edges of these strips preferably lie closely along the sides of the journal and overlie the upper offset edges 21 of the portions 11 of the plate 10 so that any excess oil will not flow down the sides of the box but will be diverted by the shedding strips 18 on to the rubbing plate 10.

The marginal edges 21 are slightly offset from their normal positions against the periphery of the journal not only to cause them to lie beneath the shedding strips 18 but also in order that the oil carried through the journal itself may be readily directed on to the portions 11 where it will be mechanically mixed with the grease.

It will thus be seen that the oil used for lubricating the journal as well as any excess oil will be constantly worked into and through the grease that is held between the plate 10 and the bottom of the journal. As before stated, this action of mixing oil and grease takes place mechanically all the time the journal is rotating and this mechanical combining of the grease and oil will act to delay the breaking down of the oil film from severe service.

When conditions of operation become severe enough to endanger the oil film, a very slight heating of the journal will result in adding more of the heavy grease to the lubricant and thus automatically perpetuate the lubricating film. And as the severity increases the heaviness of the combined oil and grease mixture is adjusted by the very act of heating to the consistency necessary to give the type of lubricating film needed to meet the condition.

There are thus all degrees of lubrication supplied, from pure oil film at starting to almost pure grease lubrication under the worst conditions. And at all times the maximum possible advantages of oil lubrication are available, with the grease present to make up for heated, poorly fitted, worn or slighted scored journals or bearings, whenever needed.

There has thus been described a preferred embodiment of the invention. Other embodiments are contemplated within the scope of the appended claims without departing from the spirit thereof.

What is claimed is:

1. A journal lubricating device embodying journal box, a plate arranged to lie against and conforming in shape to the under side of the journal, said plate having a foraminous central portion and imperforate side wings, a supply of lubricating grease arranged beneath the said central portion of the plate, spring means arranged to force the grease into contact with and through the perforations of the central portion of the plate and also arranged to force the plate upwards against the bottom of the journal, a supply of oil lubricant arranged for delivery to the journal independently of and above the said plate, and deflecting members formed on the inside walls of the journal box and arranged to deflect oil therefrom on to the side edges of the said plate.

2. A journal lubricating device embodying a plate adapted to conform to and bear against the bottom of the journal, a portion thereof being perforated, a grease block arranged beneath the perforated portion of said plate, spring means for forcing the grease block against the plate and the plate against the journal, a source of lubricating oil and means for delivering oil to the bearing independently of the grease but simultaneously therewith, and means associated with said plate for causing an intermixing of the oil and grease as the journal rotates in the bearing.

3. A journal lubricating device embodying a plate adapted to conform to and bear against the bottom of the journal, a portion thereof being perforated, a grease block arranged beneath the perforated portion of said plate, spring means for forcing the grease block against the plate and the plate against the journal, a source of lubricating oil and means for delivering oil to the bearing independently of the grease, and means associated with said plate for causing an intermixing of the oil and grease as the journal rotates in the bearing, the edges of said plate being offset slightly away from the surface of the journal in a manner to lead free oil from the journal on to the upper surface of the said plate.

4. A journal lubricating device embodying in combination with a journal box comprising a journal and a shell, a supply of grease, means for impressing the grease against the journal, a source of oil lubrication, means for delivering the oil to the journal at a point remote from the bearing contact area thereof and simultaneously with the grease lubrication thereof, and means for causing the rotation of the journal to effect a mechanical mingling of the grease and the oil, said means including an oil deflector associated with the shell of the bearing for directing free oil into the grease lubricating mechanism.

5. A journal lubricating device embodying in combination with a journal box comprising a journal and a shell, a source of pressure oil and an oil lubricating device, a supply of grease and a grease lubricating device arranged for simultaneous operation with the oil lubrication and to supplement the same, the mechanism being arranged for application of grease to the journal at a point on the periphery thereof substantially opposite to the pressure area thereof and the oil at a point remote from the zone of the heavy bearing pressure and adjacent the point of grease lubrication, and means mounted upon the shell of the bearing and coacting with a portion of the grease lubricating mechanism for directing free oil from the oil lubricating mechanism into intimate mixing relationship with the grease.

6. A journal lubricating device embodying in combination with a journal box comprising a journal and a shell, a supply of grease, means for impressing the grease against the journal, a source of oil lubrication, means for delivering the oil to the journal at a point remote from the bearing contact area thereof simultaneously with the grease lubrication thereof, and means for causing the rotating journal to spread the grease against the periphery of the journal and at the same time intimately mix the oil and grease, said means including an oil deflector carried by the shell of the bearing near the point of oil discharge, the same being adapted to direct free oil into intimate mixing relationship with the grease.

HARRY W. CODDINGTON.